United States Patent
Achten et al.

(10) Patent No.: US 12,195,577 B2
(45) Date of Patent: Jan. 14, 2025

(54) ADDITIVE MANUFACTURING PROCESS USING A BUILDING MATERIAL HAVING A HIGH HARD SEGMENT CONTENT

(71) Applicant: Stratasys, Inc., Eden Prairie, MN (US)

(72) Inventors: Dirk Achten, Leverkusen (DE); Thomas Buesgen, Leverkusen (DE); Mathias Matner, Neuss (DE); Bettina Mettmann, Pulheim (DE); Bernd Garska, Cologne (DE); Michael Kessler, Leverkusen (DE); Peter Reichert, Dormagen (DE); Roland Wagner, Leverkusen (DE); Thomas Prenveille, Ecardenville-la-Campagne (FR)

(73) Assignee: Stratasys, Inc., Eden Prairie, MN (US)

( * ) Notice: Subject to any disclaimer, the term of this patent is extended or adjusted under 35 U.S.C. 154(b) by 292 days.

(21) Appl. No.: 17/781,113

(22) PCT Filed: Dec. 14, 2020

(86) PCT No.: PCT/EP2020/085928
§ 371 (c)(1),
(2) Date: May 31, 2022

(87) PCT Pub. No.: WO2021/122429
PCT Pub. Date: Jun. 24, 2021

(65) Prior Publication Data
US 2022/0411569 A1  Dec. 29, 2022

(30) Foreign Application Priority Data
Dec. 17, 2019  (EP) .................................... 19216846

(51) Int. Cl.
B29C 64/10 (2017.01)
B29C 64/112 (2017.01)
(Continued)

(52) U.S. Cl.
CPC ........ *C08G 18/6607* (2013.01); *B29C 64/118* (2017.08); *B29C 64/165* (2017.08);
(Continued)

(58) Field of Classification Search
CPC ..... B29C 64/10; B29C 64/112; B29C 64/118; B29C 64/153; B29C 64/165;
(Continued)

(56) References Cited

U.S. PATENT DOCUMENTS 2,511,544 A    6/1950  Rinke
2009/0099600 A1*  4/2009  Moore ................ C08G 18/722
                                                       623/1.49
(Continued)

FOREIGN PATENT DOCUMENTS

DE          728981 C       12/1942
DE         2901774 A1       7/1980
WO    WO-2018046739 A1 *    3/2018    ........... B29C 64/165

OTHER PUBLICATIONS

Bayer, O. (Angew. Chem. 1947, 59, 257-288).
(Continued)

*Primary Examiner* — Leo B Tentoni
(74) *Attorney, Agent, or Firm* — Faegre Drinker Biddle & Reath LLP

(57) ABSTRACT

A method for producing an object comprises the step of producing the object by means of an additive manufacturing process from a construction material. The construction material comprises a first polyurethane polymer which has: a weight percentage ratio of O to N of $\geq 2$ to $\leq 2.5$, determined by elementary analysis; a weight percentage ratio of N to C of $\geq 0.1$ to $\leq 0.25$, determined by elementary analysis; a full-width at half maximum of the melting peak of $\leq 20$ K, determined by dynamic differential scanning calorimetry DSC ($2^{nd}$ heating at heating rate 20 k/min); and a difference
(Continued)

between the melting temperature and the recrystallisation temperature of $\geq 5$ K and $\leq 100$ K, determined by dynamic differential scanning calorimetry DSC ($2^{nd}$ heating) at a heating and cooling rate of 20 K/min.

15 Claims, 2 Drawing Sheets

(51) Int. Cl.
| | |
|---|---|
| B29C 64/118 | (2017.01) |
| B29C 64/153 | (2017.01) |
| B29C 64/165 | (2017.01) |
| B29C 64/314 | (2017.01) |
| B33Y 10/00 | (2015.01) |
| B33Y 40/10 | (2020.01) |
| B33Y 70/00 | (2020.01) |
| C08G 18/32 | (2006.01) |
| C08G 18/42 | (2006.01) |
| C08G 18/48 | (2006.01) |
| C08G 18/66 | (2006.01) |
| C08G 18/73 | (2006.01) |
| C08G 18/75 | (2006.01) |
| C08L 75/08 | (2006.01) |
| C08L 75/14 | (2006.01) |
| B29K 75/00 | (2006.01) |

(52) U.S. Cl.
CPC ............ *B29C 64/314* (2017.08); *B33Y 10/00* (2014.12); *B33Y 40/10* (2020.01); *B33Y 70/00* (2014.12); *C08G 18/3206* (2013.01); *C08G 18/4236* (2013.01); *C08G 18/4825* (2013.01); *C08G 18/664* (2013.01); *C08G 18/735* (2013.01); *C08G 18/757* (2013.01); *B29K 2075/00* (2013.01); *B29K 2995/0012* (2013.01)

(58) Field of Classification Search
CPC .... B29K 2075/00; B33Y 10/00; B33Y 70/00; C08G 18/3206; C08G 18/42; C08G 18/4236; C08G 18/48; C08G 18/4825; C08G 18/664; C08G 18/6607; C08G 18/73; C08L 75/08; C08L 75/14
USPC ........... 264/113, 308, 331.19, 460, 463, 494, 264/497; 528/76, 80, 85
See application file for complete search history.

(56) References Cited

U.S. PATENT DOCUMENTS

| | | | |
|---|---|---|---|
| 2019/0184632 A1* | 6/2019 | Achten | ................ B29C 64/165 |
| 2020/0307073 A1 | 10/2020 | Achten et al. | |
| 2021/0138720 A1 | 5/2021 | Achten et al. | |
| 2022/0289971 A1* | 9/2022 | Solouki Bonab | .. C08G 18/3206 |

OTHER PUBLICATIONS

Korshak, V.V., 10—Experimental Methods of Solution Polimerization. Comprehensive Polymer Science and Supplements, 1989. vol. 5: Step Polymerization: p. 143-165.

Korshak, V.V., Y.A. Strepikheev, and A.F. Moiseev, Preparation of linear polyurethanes without a solvent. Reaction of hexamethylene diisocyanate with 1,4-buteanediol in a melt. Condensation polymers, 1961: p. 12-15.

Korshak, V.V. and I.A. Gribova, Communication 66. Investigation of the Kinetics of Copolymerization of Diisocyanates with Glycols. High Molecular Compounds, 1953: p. 571-575.

International Search Report, PCT/EP2020/085928, date of mailing: Mar. 2, 2021, Authorized officer: Ralf Buestrich.

* cited by examiner

ADDITIVE MANUFACTURING PROCESS USING A BUILDING MATERIAL HAVING A HIGH HARD SEGMENT CONTENT

CROSS-REFERENCE TO RELATED APPLICATION

This application is a national stage application under 35 U.S.C. § 371 of PCT/EP2020/085928, filed Dec. 14, 2020, which claims the benefit of European Application No. 19216846.6, filed Dec. 17, 2019, each of which is incorporated herein by reference.

FIELD

The present invention relates to an additive manufacturing process using a build material having a high proportion of hard segments in the polymer. The invention further relates to an article obtainable by the process.

BACKGROUND

The term "additive manufacturing processes" refers to processes that construct articles in layerwise fashion. They therefore differ markedly from other processes of producing articles such as turning, milling or drilling. In the latter processes, an article is processed such that it takes on its final geometry via removal of material.

Additive manufacturing processes use different materials and processing techniques to build up articles layer by layer. In what is known as fused deposition modeling (FDM) by way of example, a thermoplastic wire is liquefied and, with the aid of a nozzle, is deposited layerwise on a movable build platform. Additive manufacturing processes that utilize thermoplastic powders to effect layerwise construction of articles also exist. In this case, thin layers of powder are applied by means of what is called a coater and then selectively melted by means of an energy source. Nylon-12 (PA12) is the material currently most commonly used for powder-based additive manufacturing processes, for example laser sintering.

Owing to their excellent physical properties, polyurethanes and especially thermoplastic polyurethanes have been used for a wide variety of different end uses for many years. In spite of the broad usability of polyurethanes, there are fields of application in which other plastics, for example polyamide plastics, are used because there are hardly any polyurethanes having suitable physical properties available or these can be provided only with difficulty. A particular example is use in additive manufacturing processes when hardnesses of ≥70 Shore D are required, such are easily obtainable via polyamides or polyether ether ketones for example. By contrast, polyurethanes in this field of application are typically limited to hardnesses of ≤70 Shore D and are typically used as rather flexible thermoplastic elastomers.

Widespread thermoplastic polyurethanes having hardnesses of ≥70 Shore D have hitherto only included MDI-based TPUs having high hard segment contents. However, these feature a high processing temperature and melting points of ≥200° C., which leads to major problems in terms of material decomposition and discoloration, particularly in powder sintering processes. This is because in this case sinter powder temperatures close to the melting point are required, at which thermoplastic polyurethanes are generally not heat and/or color stable.

Another group of thermoplastic polyurethanes having a high hard segment content are the polyurethanes based on aliphatic diisocyanates that are known under their former name Durethan U. O. Bayer (*Angew. Chem.* 1947, 59, 257-288) discloses the preparation of polyurethanes from aliphatic diisocyanates and aliphatic diols in a batchwise process, especially a polyurethane formed from hexamethylene diisocyanate and butane-1,4-diol (Perlon U, Igamid U), which is obtained as a fine, sandy powder from a precipitation polymerization in dichlorobenzene.

DE 728981 and U.S. Pat. No. 2,511,544 disclose a batchwise process for reaction of diisocyanates with diols and/or diamines to give polyurethane or polyureas in a solvent-containing or solvent-free process. Further exemplary processes for the preparation of polyurethanes with high hard segment contents are described by Korschak et al.:

Korshak, V. V., 10—Experimental Methods of Solution Polimerization. Comprehensive Polymer Science and Supplements, 1989. Volume 5: Step Polymerization: p. 143-165.

Korshak, V. V., Y. A. Strepikheev, and A. F. Moiseev, Preparation of linear polyurethanes without a solvent. Reaction of hexamethylene diisocyanate with 1,4-buteanediol in a melt. Condensation polymers, 1961: p. 12-15.

Korshak, V. V. and I. A. Gribova, Communication 66. Investigation of the Kinetics of Copolymerization of Diisocyanates with Glycols. High Molecular Compounds, 1953: p. 571-57

It would be desirable to provide hard thermoplastic polyurethanes for use in additive manufacturing processes and in particular in powder sintering processes which feature a high hardness in combination with a melting point and a recrystallization temperature in the temperature range of ≤189° C., at which urethanes are still stable at least for a short time, and which thus allow sintered products having good mechanical properties and only a low level of discoloration.

SUMMARY

It is an object of the present invention to at least partially overcome at least one disadvantage of the prior art. It is a further object of the present invention to specify an additive manufacturing process which makes it possible to process polyurethane build materials having a high hard segment content.

According to the invention, this object is achieved by a process as claimed and an article as claimed. Advantageous developments are specified in the subsidiary claims. They may be combined as desired unless the opposite is clear from the context.

DETAILED DESCRIPTION

A process for producing an article comprises the step of producing the article by means of an additive manufacturing process from a build material. The build material comprises a first polyurethane polymer having a percent by weight ratio of O to N determined by elemental analysis of ≥2 to ≤2.5, a weight ratio of N to C determined by elemental analysis of ≥0.1 to ≤0.25, a full width at half maximum of the melting peak determined by differential scanning calorimetry (DSC; 2nd heating at heating rate of 20 K/min) of ≤20 K (preferably ≤17 K, more preferably ≤15 K and particularly preferably ≤12 K) and a difference between the melting temperature and the recrystallization temperature determined by differential scanning calorimetry (DSC; 2nd heating) at a heating and cooling rate of 20 K/min of ≥5 K and ≤100 K.

The article to be produced may in and of itself be the target of the production process. Alternatively, it is possible that the article to be produced is part of a larger composite and the production thereof constitutes a component step in the production of the composite.

According to the invention, the article is produced from a build material by means of an additive manufacturing process ("3D printing"). The additive manufacturing process may be selected, for example, from melt coating (fused filament fabrication, FFF, or fused deposition modelling, FDM), selective laser sintering, selective laser melting or high-speed sintering or else binder jetting.

The term "melt-layering process" refers to a manufacturing process from the field of additive manufacturing, by which a workpiece is formed in layerwise fashion, for example from a meltable plastic. The plastic may be used with or without further additions such as fillers. Machines for FDM/FFF form part of the machine class of 3D printers. This process is based on the liquefaction of a plastic or wax material in wire form by heating. The material solidifies in the course of final cooling. Material application is effected by extrusion with a heating nozzle which is freely movable in relation to a manufacturing plane. It is possible here either for the manufacturing plane to be fixed and for the nozzle to be freely movable or for a nozzle to be fixed and a substrate table (with a manufacturing plane) to be movable, or for both elements, the nozzle and manufacturing plane, to be movable. The speed at which substrate and nozzle are movable with respect to one another is preferably within a range from 1 to 500 mm/s. The layer thickness is within a range from 0.01 and 5 mm depending on the application; the exit diameter of the material jet (nozzle outlet diameter) from the nozzle is typically at least 0.01 mm.

In layerwise modelling the individual layers thus join to form a complex part. The construction of an article is customarily effected by repeatedly tracing a working plane line by line (forming a layer) and then moving the working plane upward in a "stacking" manner (forming at least one further layer atop the first layer) so as to form a shape in layerwise fashion. The exit temperature of the mixtures of material from the nozzle may for example be 80° C. to 420° C. It is additionally possible to heat the substrate table and/or an optionally present build space, for example to 20° C. to 250° C. This can prevent excessively rapid cooling of the applied layer so that a further layer applied thereupon is sufficiently joined to the first layer.

Sintering processes in the context of the present invention are processes which in particular use thermoplastic powders for layerwise construction of articles. In these, a so-called coater applies thin layers of powder which are then selectively melted using an energy source. The surrounding powder supports the component geometry. Complex geometries can thus be manufactured more economically than in the FDM process. Moreover, different articles may be arranged or manufactured in a tightly packed manner in the so-called powder bed. These advantages make powder-based additive manufacturing processes among the most economic additive manufacturing processes on the market. They are therefore used predominantly by industrial users. Examples of powder-based additive manufacturing processes are so-called selective laser sintering (SLS) or high-speed sintering (HSS). They differ from one another in terms of the method of introducing energy for the selective melting into the plastic. In the laser sintering process energy input is effected via a deflected laser beam. In the so-called high-speed sintering (HSS) process, the energy is introduced via infrared (IR) sources in combination with an IR absorber selectively printed into the powder bed. So-called selective heat sintering (SHS) utilizes the printing unit of a conventional thermal printer to selectively melt thermoplastic powders. Selective laser sintering processes (SLS) are preferred. In addition to the first polyurethane polymer the build material may also contain other thermoplastic polymers and additives such as fillers, stabilizers and the like. The total content of additives in the build material may be for example ≥0.1% by weight to ≤50% by weight, preferably ≥0.5% by weight to ≤30% by weight.

It is provided according to the invention that the first polyurethane polymer has a percent by weight ratio of O to N determined by elemental analysis of ≥2 to ≤2.5 and a weight ratio of N to C determined by elemental analysis of ≥0.1 to ≤0.25. Polyurethanes having such analytical data have a high hard segment content, i.e. a high proportion of urethane groups in the molecule. They often have a high crystallinity and, due to the many hydrogen bonds between the urethane groups of adjacent chains, a relatively sharply defined melting point and a defined recrystallization behavior. This is also expressed by the requirement of a full width at half maximum of the melting peak determined by differential scanning calorimetry (DSC; 2nd heating at heating rate of 20 K/min) of ≤20 K (preferably ≤17 K, particularly preferably ≤15 K and more preferably ≤12 K) and a difference between the melting temperature and the recrystallization temperature determined by differential scanning calorimetry (DSC; 2nd heating) at a heating and cooling rate of 20 K/min of ≥5 K and ≤100 K (preferably ≥7 K and ≤60 K, more preferably ≥9 K and ≤50 K and particularly preferably ≥10 K and ≤25 K). Evaluation of the melting temperature and the recrystallization temperature is in each case done using the peak maximum. To determine the full width at half maximum of the melting peak the DSC curve is evaluated such that the straight portions of the curve, which do not indicate any sudden endothermic or exothermic change, are used as a basis and the full width at half maximum is defined as the width of the peak at half of the maximum peak height.

Overall, the first polyurethane polymer may be used as a substitute for polyamides such as PA 12, wherein the material costs are lower than those of the polyamide.

It is thus particularly advantageously possible to combine a high flowability at high temperatures of only short duration, preferably ≤60 seconds, particularly preferably ≤30 seconds, for example in the SLS process during exposure to the laser or in the FDM process during heating in the heating block in front of the nozzle, with a rapid viscosity increase at lower temperatures just above the melting point. The viscosity jump from 190° C. to 240° C. is preferably reversible, i.e. after an exposure time to 240° C. of not more than 1 minute, ≥50%, preferably ≥60% and more preferably ≥70% of the starting viscosity according to ISO 6721-10: 2015-09 at 1/s and 0.1% deformation is regained after 1 minute at 190° C.

The first polyurethane polymer in the process according to the invention is obtained from an isocyanate component and an isocyanate-reactive component, wherein the isocyanate-reactive component may contain not only Zerewitinoff-active H atom-containing compounds but also further, unreactive additives.

The isocyanate component may contain in particular aliphatic, cycloaliphatic or aralipathic diisocyanates, wherein monomeric diisocyanates are preferred. Suitable compounds are for example in the molecular weight range from ≥140 to ≤400 g/mol, it being immaterial whether these have been obtained by means of phosgenation or by phosgene-free processes.

Examples of suitable aliphatic diisocyanates are 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,8-diisocyanatooctane and 1,10-diisocyanatodecane.

Examples of suitable cycloaliphatic diisocyanates are 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane and 1,3-dimethyl-5,7-diisocyanatoadamantane.

Examples of suitable araliphatic diisocyanates are 1,3- and 1,4-bis(isocyanatomethyl)benzene (xylylene diisocyanate; XDI), 1,3- and 1,4-bis(1-isocyanato-1-methylethyl)benzene (TMXDI).

Preference is given to using aliphatic and cycloaliphatic diisocyanates having a molecular weight between ≥140 and ≤400 g/mol, especially aliphatic and cycloaliphatic diisocyanates selected from the group consisting of 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,8-diisocyanatooctane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI) and/or mixtures of at least 2 of these. Preference is given to 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, diisocyanatooctane, 1,10-diisocyanatodecane, 1,3- and 1,4-diisocyanatocyclohexane, 1,3-diisocyanato-2-methylcyclohexane, 1-isocyanato-3,3,5-trimethyl-5-isocyanatomethylcyclohexane (isophorone diisocyanate; IPDI) and/or mixtures of at least 2 of these, more preferably 1,4-diisocyanatobutane (BDI), 1,5-diisocyanatopentane (PDI), 1,6-diisocyanatohexane (HDI), 2-methyl-1,5-diisocyanatopentane and/or mixtures of at least 2 of these.

Also employable in a particular embodiment are difunctional polyisocyanates of reaction products of isocyanates with themselves and, for example, $CO_2$, such as for example HDI-based (poly)uretdiones and for example HDI-based (poly)isocyanato-[poly[3-hexyloxadianzine-2,4,6-trione)]-5-isocyanatohexyl.

The isocyanate component may also contain polyisocyanates having an average functionality of ≥2. Examples of suitable polyisocyanates are triphenylmethane 4,4',4"-triisocyanate or isocyanatomethyloctane 1,8-diisocyanate (TIN). It is especially also possible to use derivatives of the abovementioned diisocyanates. Examples of these are the commercially available trimers (biurets, uretdiones, allophanates or isocyanurates) of 1,4-diisocyanatobutane (BDI), 1,5-diisocyanatopentane (PDI), 1,6-diisocyanatohexane (HDI), 1-isocyanato-3,3,5-trimethyl-5-isocyanatomethylcyclohexane or 2,4'- and 4,4'-diisocyanatodicyclohexylmethane. These polyisocyanates may be added up to an amount at which the thermoplastic properties of the end product are retained, for example ≤2 percent by weight, preferably ≤1 percent by weight and particularly preferably ≤0.5 percent by weight based on the total weight of the isocyanate component.

The isocyanate-reactive component may contain one or more difunctional alcohols, in particular aliphatic, araliphatic or cycloaliphatic alcohols having molecular weights of less than 210 g/mol. These may include for example: ethane-1,2-diol, propane-1,2-diol and propane-1,3-diol, the isomers of butanediol, pentanediol, hexanediol, heptanediol, octanediol, nonanediol, decanediol, undecanediol, dodecanediol, cyclobutane-1,3-diol, cyclopentane-1,3-diol, cyclohexane-1,2-, -1,3- and -1,4-diol, cyclohexane-1,4-dimethanol, 2-cyclohexene-1,4-diol, 2-methylcyclohexane-1,4-diol, 2-ethylcyclohexane-1,4-diol, 2,2,4,4-tetramethylcyclobutane-1,3-diol, hydrogenated bisphenol A (2,2-bis(4-hydroxycyclohexyl)propane), cycloheptane-1,3-diol, cycloheptane-1,4-diol, 2-methylcycloheptane-1,4-diol, 4-methylcycloheptane-1,3-diol, 4,4'-(1-methylethylidene)biscyclohexanol, cyclooctane-1,3-diol, cyclooctane-1,4-diol, cyclooctane-1,5-diol, 5-methylcyclooctane-1,4-diol, 5-ethylcyclooctane-1,4-diol, 5-propylcyclooctane-1,4-diol, 5-butylcyclooctane-1,4-diol. It is also possible to use mixtures of the abovementioned alcohols. It is preferable to employ aliphatic, araliphatic or cycloaliphatic alcohols having molecular weights of ≤210 g/mol, more preferably ≤150 g/mol, particularly preferably ≤120 g/mol. It is particularly preferable to employ linear polyols having terminal OH groups in weight fractions of ≥80% based on the polyol content.

In a particular embodiment up to 20 mol % of water, preferably up to 10 mol % of water and particularly preferably up to 5 mol % of water is employed based on the isocyanate group, wherein the functionality of water is 2. In this case the polymerization process produces not only polyurethanes but also smaller amounts of polyureas by elimination of carbon dioxide.

In a particular embodiment up to 20 mol % of ammonia, preferably up to 10 mol % of ammonia and particularly preferably up to 5 mol % of ammonia is employed based on the isocyanate group, wherein the functionality of ammonia is calculated as 2. In this case the polymerization process produces not only polyurethanes but also smaller amounts of polybiurets.

For the first polyurethane polymer the components 1,6-diisocyanatohexane, 1,5-diisocyanatopentane and/or 1,4-diisocyanatobutane with propane-1,3-diol, butane-1,4-diol, pentane-1,5-diol and/or hexane-1,6-diol are preferred.

The isocyanate-reactive component may also contain as additives small amounts of customary isocyanate-reactive mono-, tri- or polyfunctional compounds in proportions of ≤2 percent by weight, preferably ≤1 percent by weight and particularly preferably ≤0.5 percent by weight based on the total weight of the isocyanate-reactive component, for example as chain terminators, auxiliaries or demolding agents. Examples include alcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol and stearyl alcohol. Examples of suitable triols are trimethylolethane, trimethylolpropane or glycerol. Suitable higher-functionality alcohols are ditrimethylolpropane, pentaerythritol, dipentaerythritol or sorbitol Amines such as butylamine and stearylamine or thiols.

The polyol-reactive component may also contain as additives small amounts of mono-, tri- or polyfunctional isocyanates in proportions of ≤2% by weight based on the total weight of the polyol-reactive component, for example as chain terminators, auxiliaries or demolding agents.

It is also possible to employ smaller amounts (for example ≤10% by weight, preferably ≤5% by weight, based on the total weight of the isocyanate-reactive component) of polyester polyols, polyether polyols, polycarbonate polyols, polyamide polyols or analogous amine-terminated compounds as polyol components in order to influence particular effects such as toughness and crystallization rate as desired.

The isocyanate-reactive formulation may also contain as additives small amounts of further isocyanate-reactive components, for example amines, thiols, epoxides, acids, acid anhydrides, and also mono-, di-, tri- or polyfunctional materials in proportions of for example ≤10% by weight, preferably ≤5% by weight, particularly preferably ≤2% by weight, based on the total weight of the isocyanate-reactive formulation.

To prepare the thermoplastic polyurethanes for use according to the invention in additive manufacturing processes the isocyanate component and the isocyanate-reactive component may be reacted optionally in the presence of one or more catalysts, auxiliaries and/or additives.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo-(2.2.2)-octane and the like and also in particular organic metal compounds such as titanate esters, iron compounds, tin compounds, for example tin diacetate, tin dioctoate, tin dilaurate or the dialkyltin salts of aliphatic carboxylic acids such as dibutyltin diacetate or dibutyltin dilaurate or the like. Preferred catalysts are organic metal compounds, in particular titanate esters, iron compounds and/or tin compounds.

The catalyst is generally used in amounts of 0% to 2.0% by weight, preferably of 0.005% to 1.0% by weight, particularly preferably of 0.01% to 0.1% by weight, based on the isocyanate component. The catalyst may be employed neat or for example dissolved in the isocyanate-reactive component or, in a particular embodiment, dissolved in the isocyanate component. This has the advantage that the thermoplastic polyurethanes then obtained do not contain any impurities as a result of any catalyst solvents also used. The catalyst can be added in one or more portions or else continuously, for example with the aid of a suitable metering pump, over the entire duration of the reaction.

It is alternatively possible to use mixtures of the catalyst(s) with a catalyst solvent, preferably with an organic catalyst solvent. The degree of dilution of the catalyst solutions is freely choosable within a very wide range. Solutions are catalytically active above a concentration of 0.01% by weight.

Suitable catalyst solvents are, for example, solvents that are inert towards isocyanate groups, for example hexane, toluene, xylene, chlorobenzene, ethyl acetate, butyl acetate, diethylene glycol dimethyl ether, DMSO, dipropylene glycol dimethyl ether, ethylene glycol monomethyl ether acetate or ethylene glycol monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

However, it is also possible to employ catalyst solvents which bear isocyanate-reactive groups and may be incorporated into the polyisocyanate. Examples of such solvents are for example water, mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; araliphatic alcohols, for example benzyl alcohol; N-monosubstituted amides, for example N-methylformamide, N-methylacetamide, cyanoacetamide or 2-pyrrolidinone, or any desired mixtures of such solvents.

It is moreover also possible to employ auxiliaries and/or additives. These may include, for example, customary additives in the field of thermoplastics technology such as dyes, fillers, fibrous fillers, processing auxiliaries, plasticizers, water, nucleating agents, stabilizers, flame retardants, demolding agents or reinforcing additives. Further information about the auxiliaries and additives mentioned may be found in the specialist literature, for example in the monograph by J. H. Saunders and K. C. Frisch "High Polymers", Volume XVI, Polyurethane, Part 1 and 2, Interscience Publishers 1962/1964, in "Taschenbuch für Kunststoff-Additive" by R. Gächter and H. Müller (Hanser Verlag Munich 1990) or in DE-A 29 01 774. It will be self-evident that it can likewise be advantageous to use a plurality of additives of a plurality of types.

Preparation of the first polyurethane polymer may also be effected via a prepolymer. The following combinations are preferred for the preparation of an OH-terminated prepolymer: 1,4-diisocyanatobutane with ethane-1,2-diol, 1,4-diisocyanatobutane with propane-1,2- and/or -1,3-diol, 1,4-diisocyanatobutane with butane-1,2-, -1,3- and/or -1,4-diol, 1,4-diisocyanatobutane with pentane-1,5-diol, 1,4-diisocyanatobutane with hexane-1,6-diol, 1,4-diisocyanatobutane with heptane-1,7-diol, 1,4-diisocyanatobutane with octane-1,8-diol, 1,4-diisocyanatobutane with nonane-1,9-diol, 1,4-diisocyanatobutane with decane-1,10-diol, 1,4-diisocyanatobutane with cyclobutane-1,3-diol, 1,4-diisocyanatobutane with cyclopentane-1,3-diol, 1,4-diisocyanatobutane with cyclohexane-1,2-, -1,3- and -1,4-diol and/or mixtures of at least 2 isomers, 1,4-diisocyanatobutane with 1,4-cyclohexanedimethanol;

1,5-diisocyanatopentane with ethane-1,2-diol, 1,5-diisocyanatopentane with propane-1,2- and/or -1,3-diol, 1,5-diisocyanatopentane with butane-1,2-, -1,3- and/or -1,4-diol, 1,5-diisocyanatopentane with pentane-1,5-diol, 1,5-diisocyanatopentane with hexane-1,6-diol, 1,5-diisocyanatopentane with heptane-1,7-diol, 1,5-diisocyanatopentane with octane-1,8-diol, 1,5-diisocyanatopentane with cyclobutane-1,3-diol, 1,5-diisocyanatopentane with cyclopentane-1,3-diol, 1,5-diisocyanatopentane with cyclohexane-1,2-, -1,3- and -1,4-diol and/or mixtures of at least 2 isomers, 1,5-diisocyanatopentane with 1,4-cyclohexanedimethanol;

1,6-diisocyanatohexane with ethane-1,2-diol, 1,6-diisocyanatohexane with propane-1,2- and/or -1,3-diol, 1,6-diisocyanatohexane with butane-1,2-, -1,3- and/or -1,4-diol, 1,6-diisocyanatohexane with pentane-1,5-diol, 1,6-diisocyanatohexane with hexane-1,6-diol, 1,6-diisocyanatohexane with heptane-1,7-diol, 1-isocyanato-3,3,5-trimethyl-5-isocyanatomethylcyclohexane with ethane-1,2-diol and 1-isocyanato-3,3,5-trimethyl-5-isocyanatomethylcyclohexane with propane-1,2- and/or -1,3-diol.

It is also possible for the build material to comprise further polyurethane polymers in addition to the first polyurethane polymer.

In a preferred embodiment the first polyurethane polymer comprises a proportion of hard segments, expressed as the weight ratio of the sum of constituents derived from Zerewitinoff-active compounds having three or fewer repeating units in the molecule and the isocyanate units joined thereto to the total weight of the polyurethane polymer, of ≥80% by weight to ≤100% by weight. A proportion of ≥90% by weight to ≤99% by weight is preferred. Typical repeating units are in the present case to be understood as meaning for example the repeating units in amino- or OH-terminated polyethers, polyesters and polycarbonates.

In a further preferred embodiment the first polyurethane polymer comprises a proportion of compounds derived from isocyanates of ≥50% by weight. This proportion is preferably ≥55% by weight, more preferably ≥60% by weight. The weight fraction of the NCO component is easily calculated from the reaction mixture used for preparation of the polyurethane.

In a further preferred embodiment the first polyurethane polymer has been obtained from the reaction of an isocyanate component comprising ≥80% by weight of aliphatic isocyanates and an isocyanate-reactive component. Preference is given to ≥90% by weight of aliphatic isocyanates, greater preference to ≥95% by weight of aliphatic isocyanates. In a further preferred embodiment small amounts of aromatic diisocyanates are added, for example in proportions of up to 2% by weight based on the total weight of the isocyanate component. Examples of suitable aromatic diisocyanates include 2,4- and 2,6-diisocyanatotoluene (TDI), 2,4'- and 4,4'-diisocyanatodiphenylmethane (MDI) and 1,5-diisocyanatonaphthalene and O-tolidine diisocyanate (TODI).

In a further preferred embodiment the first polyurethane polymer has been obtained from the reaction of an isocyanate component comprising ≥80% by weight of linear aliphatic isocyanates and an isocyanate-reactive component comprising ≥80% by weight of linear aliphatic polyols. The first polyurethane polymer is particularly preferably a polyurethane polymer obtained from an isocyanate component comprising ≥90% by weight of hexamethylene 1,6-diisocyanate or pentamethylene diisocyanate and an isocyanate-reactive component comprising ≥90% by weight of butane-1,4-diol or propane-1,3-diol or pentane-1,5-diol or hexane-1,6-diol.

In a further preferred embodiment of the process the polyurethane polymer has been obtained from the reaction of a linear diisocyanate component comprising ≥80% by weight, preferably ≥90% by weight and particularly preferably ≥95% by weight of the one linear aliphatic isocyanate and a linear diol component comprising ≥80% by weight, preferably ≥90% by weight and particularly preferably ≥95% by weight of the one linear aliphatic polyol. It is particularly preferable when the one linear diisocyanate is hexamethylene 1,6-diisocyanate or 1,5-pentane diisocyanate and the one linear diol is propane-1,3-diol or butane-1,4-diol or pentane-1,5-diol or hexane-1,6-diol. But particularly preferably butane-1,4-diol or butane-1,6-diol.

In a further particularly preferred embodiment the sum of the number of carbon atoms in the predominant aliphatic diisocyanate component and the number of carbon atoms in the predominant aliphatic diol component divided by 2 is a real number. It has been found that the combination of even-numbered (with respect to their carbon atoms) isocyanates and diols results in units that crystallize particularly well and are advantageous for use in 3D printing.

In a further preferred embodiment the build material has a melting point determined by differential scanning calorimetry (DSC; 2nd heating at a heating rate of 20 K/min) of ≥120° C. to ≤189° C. and the full width at half maximum of the melting point peak (differential scanning calorimetry, DSC; 2nd heating at a heating rate of 20 K/min) of the build material is ≥5 K to ≤20 K. It is preferable when the melting point is ≥140° C. to ≤187° C. and the full width at half maximum of the melting point peak is ≥5 K to ≤17 K. It is very particularly preferable when the melting point is ≥150° C. to ≤185° C. and the full width at half maximum of the melting point peak is ≥5 K to ≤15 K.

In a further preferred embodiment the build material has a glass transition point determined by differential scanning calorimetry (DSC; 2nd heating at a heating rate of 20 K/min) of ≥0° C. to ≤50° C.

In a further preferred embodiment the build material exhibits after 1000 hours of SAE J 1960 CAM 180 weathering (see also: Farbe & Lack, issue September 2007, page: 46 Kürzer in der Klimakammer) a color number increase of ≤50, preferably ≤30, particularly preferably ≤20 and very particularly preferably ≤10 in the b value.

In a further preferred embodiment the complex viscosity of the molten build material determined via a plate/plate rheometer according to ISO 6721-10:2015-09 at 1/s and 0.1% deformation and 200° C., measured after 1 minute in each case, is still ≥50% of the complex viscosity of the molten build material measured at 190° C. In a particularly preferred embodiment the complex viscosity of the molten build material measured at 240° C., by contrast, is only ≤15%, preferably ≤10% and very particularly preferably ≤5% of the complex viscosity of the molten build material measured at 190° C. The slow decrease in the melt viscosity above the melting temperature that is typical for high molecular weight polymers in the melt combined with the exceptionally high decrease in the melt viscosity of the build material according to the invention at temperatures above >>200° C. is particularly advantageous for configuring the properties of components in 3D printing processes in the SLS and FDM process, where high temperatures may be reached for a short time, where the polymers to be processed typically undergo thermal degradation and the materials are to have good flowability, because a simple temperature increase allows the melt properties and flow properties of the polymer according to the invention to be precisely controlled in a wide range, thus allowing targeted configuration of material flows and porosities.

It is thus particularly advantageously possible to combine a high flowability at high temperatures of only short duration, preferably ≤60 seconds, particularly preferably ≤30 seconds, for example in the SLS process during exposure to the laser or in the FDM process during heating in the heating block in front of the nozzle, with a rapid viscosity increase at lower temperatures just above the melting point. The viscosity jump from 190° C. to 240° C. is preferably reversible, i.e. after an exposure time to 240° C. of not more than 1 minute, ≥50%, preferably ≥60% and more preferably ≥70% of the starting viscosity according to ISO 6721-10: 2015-09 at 1/s and 0.1% deformation is regained after 1 minute at 190° C.

In a further preferred embodiment the complex viscosity of the molten build material at 240° C. regains ≥50% of the starting viscosity according to ISO 6721-10:2015-09 at 1/s and 0.1% deformation at 190° C. after 1 minute after cooling to 190° C.

In a further preferred embodiment the production of the article by the additive manufacturing process comprises the steps of:
applying a layer of particles comprising the build material to a target surface;
energizing a selected portion of the layer corresponding to a cross section of the article to join the particles in the selected portion;
repeating the steps of applying and energizing for a plurality of layers to join the joined portions of the adjacent layers to form the article.

This embodiment concerns a powder sintering or powder melting process. If the number of repetitions for applying and irradiating is sufficiently low the article to be constructed may also be referred to as a two-dimensional article. Such a two-dimensional article can also be characterized as a coating. Construction thereof may comprise performing for example ≥2 to ≤20 repetitions for application and irradiation. This is particularly advantageous for coating processes based on powder sintering.

It is preferable when at least 90% by weight of the particles have a particle diameter of ≤0.5 mm, preferably ≤0.3 mm, particularly preferably ≤0.15 mm. The energy source for joining the particles may be electromagnetic energy, for example UV to IR light. An electron beam is also conceivable. The joining of the particles in the irradiated portion of the particle layer is typically effected through (partial) melting of a (semi)crystalline material and joining of the material in the course of cooling.

In a further preferred embodiment, the energizing of a selected portion of the layer corresponding to a cross section of the article such that the particles in the selected portion are bonded comprises the following step:
printing a radiant energy-absorbing and/or radiant energy-reflecting material onto a selected portion of the layer and energizing the layer, wherein the selected portion of the layer preferably exhibits a higher or lower absorption of the energy, so that the particles in the selected portion or surrounding the selected portion are joined according to a cross section of the article.

This form of the process may be regarded as a selective sintering process, in particular as a selective laser sintering process (SLS), or as a multi jet fusion laser sintering process. The energy beam for joining the particles may be a beam of electromagnetic energy, for example a "light beam" of UV to IR light. The energy beam is preferably a laser beam, more preferably having a wavelength between 600 nm and 15 µm. The laser may take the form of a semiconductor laser or of a gas laser. An electron beam is also conceivable. The energizing is preferably carried out by means of an IR laser and the at least intermittent exposure of the build material to infrared radiation in the wavelength range between 600 nm and 1700 nm envisaged according to the invention is therefore also realized thereby. It is also possible in the multi jet fusion process to irradiate the entire area with, for example, IR radiation and sinter only selected regions.

In a further preferred embodiment the production of the article by the additive manufacturing process comprises the steps of:
applying a filament of an at least partially molten build material to a carrier to obtain a layer of the build material corresponding to a first selected cross section of the article;
optionally applying a filament of the at least partially molten build material to a previously applied layer of the build material to obtain a further layer of the build material which corresponds to a further selected cross section of the article and is joined to the previously applied layer;
optionally repeating the step of applying a filament of the at least partially molten build material to a previously applied layer of the build material until the article has been formed.

This embodiment is a melt coating or fused deposition modeling (FDM) process. If the number of repetitions for the applying is sufficiently low, the article to be constructed may also be referred to as a two-dimensional article. Such a two-dimensional article can also be characterized as a coating. For example construction thereof may comprise performing ≥1 to ≤20 repetitions for the applying.

The individual filaments which are applied may have a diameter of ≥30 µm to ≤5000 µm, preferably ≥40 µm to ≤2000 µm and particularly preferably ≥50 µm to ≤1000 µm.

The first step of this embodiment of the process relates to the construction of the first layer on a carrier. The second step in which further layers are applied to previously applied layers of the build material is subsequently performed until the desired end result in the form of the article is obtained. The at least partially molten build material joins with existing layers of the material to construct a structure in the z direction. But it is possible that just one layer of the build material is applied to a carrier.

In a further preferred embodiment the process is performed inside a build space and the temperature of the build space is ≥5° C., preferably ≥10° C. and very particularly preferably ≥15° C. lower than the melting temperature $T_m$ of the build material (determined by differential scanning calorimetry, DSC, according to DIN EN ISO 11357-1:2017-02 at a heating rate of 20° C./min) and preferably ≥5° C., particularly preferably ≥20° C. and very particularly preferably ≥50° C. greater than the Tg of the build material (determined by differential scanning calorimetry, DSC, according to DIN EN ISO 11357-1:2017-02 at a heating rate of 20° C./min). Particularly in the case of complex and large components having a long manufacturing time this is associated with a markedly lower thermal stress and better dimensional accuracy of the component. In powder sintering processes the powders may be processed at a markedly lower build space temperature. This makes it possible to avoid unwanted sintering of powder beneath the (activated) surface.

A further aspect of the invention is an article obtainable by a process according to the invention, wherein the article is produced from a build material comprising a first polyurethane polymer which has a percent by weight ratio of O to N determined by elemental analysis of ≥2 to ≤2.5, a weight ratio of N to C determined by elemental analysis of ≥0.1 to ≤0.25, a full width at half maximum of the melting peak determined by differential scanning calorimetry (DSC; 2nd heating at heating rate of 20 K/min) of ≤20 K and a difference between the melting temperature and the recrystallization temperature determined by differential scanning calorimetry (DSC; 2nd heating) at a heating and cooling rate of 20 K/min of ≥5 K and ≤100 K and wherein the article has a tensile strength (ISO 527:2012) in the build direction of the additive manufacturing process used in its production which is ≥20% to ≤100% of the tensile strength (ISO 527:2012) of an injection molded test specimen made of the same build material. These tensile strengths in the additively manufactured article thus relate to the adhesion of individual layers of the build material to one another.

In a preferred embodiment of the article the first polyurethane polymer comprises a proportion of hard segments, expressed as the weight ratio of the sum of constituents derived from Zerewitinoff-active compounds having three or fewer repeating units in the molecule and the isocyanate units joined thereto to the total weight of the polyurethane polymer, of ≥80% by weight to ≤100% by weight. A proportion of ≥90% by weight to ≤99% by weight is preferred.

In a further preferred embodiment of the article the first polyurethane polymer comprises a proportion of compounds derived from isocyanates of ≥50% by weight. This proportion is preferably ≥55% by weight, more preferably ≥60% by weight. The weight fraction of the NCO component is easily calculated from the reaction mixture used for preparation of the polyurethane.

In a further preferred embodiment of the article the first polyurethane polymer has been obtained from the reaction of an isocyanate component comprising ≥80% by weight of aliphatic isocyanates and an isocyanate-reactive component. Preference is given to ≥90% by weight of aliphatic isocyanates, greater preference to ≥95% by weight of aliphatic isocyanates. In a further preferred embodiment small amounts of aromatic diisocyanates are added, for example in proportions of up to 2% by weight based on the total weight of the isocyanate component. Examples of suitable aromatic diisocyanates include 2,4- and 2,6-diisocyanatotoluene (TDI), 2,4'- and 4,4'-diisocyanatodiphenylmethane (MDI) and 1,5-diisocyanatonaphthalene and O-tolidine diisocyanate (TODI).

In a further preferred embodiment of the article the first polyurethane polymer has been obtained from the reaction of an isocyanate component comprising ≥80% by weight of linear aliphatic isocyanates and an isocyanate-reactive component comprising ≥80% by weight of linear aliphatic polyols. The first polyurethane polymer is particularly preferably a polyurethane polymer obtained from an isocyanate component comprising ≥90% by weight of hexamethylene 1,6-diisocyanate and an isocyanate-reactive component comprising ≥90% by weight of butane-1,4-diol.

Having regard to the first polyurethane polymer reference is made to the foregoing concerning the process according to the invention, also in respect of further preferred embodiments, in order to avoid repetition.

EXAMPLES

The present invention is more particularly elucidated with reference to the figures and examples which follow but without being limited thereto.

ANALYTICAL METHODS

Figure 1:
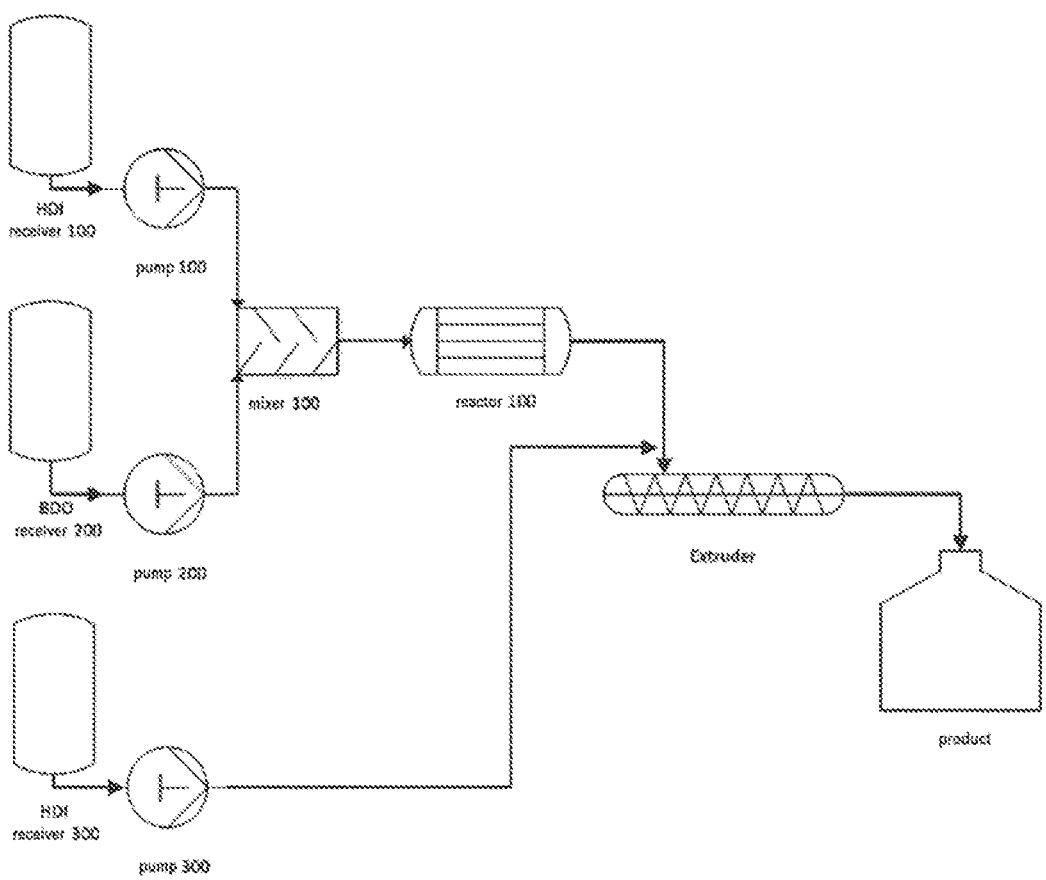
FIG. 1 shows a setup for performing the two-stage continuous preparation of a prepolymer through reaction in a temperature-controlled polymerization reactor and an extruder.

GPC Method for Determining Mn and Mw

The number-average and weight-average molar mass were determined by gel permeation chromatography (GPC). To this end the sample to be analyzed was dissolved in a solution of 3 g of potassium trifluoroacetate in 400 cm$^3$ of hexafluoroisopropanol (concentration of sample about 2 mg/cm$^3$). The respective GPCs were measured with the following components at a flow rate of 1 cm$^3$/minute:
Pump: 515 HPLC pump (Waters GmbH)
Detector: Smartline 2300 RI detector (Knauer Wissenschaftliche Geräte GmbH)
Columns: 1 precolumn, 1000 Å PSS PFG 7 μm, 300 Å PSS PFG 7 μm, 100 Å PSS PFG 7 μm in this sequence (PSS Polymer Standards Service GmbH)
Degassing: PSS Degasser (PSS Polymer Standards Service GmbH)
Injection volume: 100 microliters
Temperature: 23° C.-25° C.
Molar mass standard: Polymethylmethacrylate standard kit (PSS Polymer Standards Service GmbH)

Color Values

Color values in the CIE-Lab color space were determined with a Konica Minolta CM5 spectrophotometer with the D 65 illuminant, 10° observer, in accordance with DIN EN ISO 11664-1 (July 2011).

Differential Scanning Calorimetry (DSC)

Melting point was determined by DSC (differential scanning calorimetry) with a Mettler DSC 12E (Mettler Toledo GmbH, Giessen, DE) according to DIN EN 61006 (November 2004). Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 20 K/min. Cooling was effected by means of liquid nitrogen. The purge gas used was nitrogen. The values reported are in each case based on evaluation of the 2nd heating curve.

Screening By Differential Thermal Analysis (DTA)

The enthalpy data were ascertained by means of a screening DTA and conducted in an ISO 17025 accredited laboratory. The samples were weighed out in glass ampoules, sealed gas-tight and heated in the measuring instrument from −50 to +450° C. at 3 K/min. By means of thermocouples, the differential between the sample temperature and the temperature of an inert reference (aluminum oxide) was determined. The sample weight was 20-30 mg. All measurements were performed according to DIN 51007 (June 1994).

Determination of Maximum Bending Stress

Bending stress was determined on test specimens (rods measuring 80 mm×10 mm×4 mm) by means of a slow three-point bending test at room temperature according to DIN EN ISO 178 (September 2013) performed with an Instron 5566 universal tester at a speed of 5 mm/min, a fin radius of 5 mm and a support distance of 64 m.

Determination of Maximum Tensile Stress

Tensile testing was determined on test specimens (rods measuring 80 mm×10 mm×4 mm). Slow tensile tests at room temperature, performed with a Zwick Z010 universal testing machine at a speed of 10 mm/min.

Determination of Complex Viscosity

Complex viscosity was measured using an ARES-G2 oscillation rheometer from TA Instruments in accordance with ISO 6721-10:1999. To this end the sample was first dried in a vacuum oven at 40° C. for at least 4 days and then pressed into sheets of 25 mm or 35 mm in diameter at 190° C. over 30 s. These samples were placed in the oven of the rheometer which was preheated to the measurement temperature. Once the sample had achieved the measurement temperature, oscillating measurement in plate-plate geometry under a nitrogen atmosphere was commenced. The storage and loss shear moduli were determined in the range from 100 Hz to 0.01 Hz at the measurement temperature.

Elemental Analyses

CONH analyses were performed at Currenta GmbH & Co. OHG in Leverkusen, DE

Isocyanate Titration

By back-titration of butylamine with 0.1 N hydrochloric acid after addition of an amine excess to an isocyanate solution using a Metrohm, 751 GPD titrino 685 Dosimat and 728 stirrer.

Printing Tests

Printing tests to test suitability as 3D printing sintering materials were carried out in a Farsoon F 251 P apparatus. S2 tensile test bars were produced by laser sintering (if possible). Five tensile test specimens of each of the respective powders/powder mixtures were tested in a tensile test in accordance with DIN 53504. The averages of the results obtained are reported in table 2.

Raw Materials Used

Hexamethylene 1,6-diisocyanate (HDI), pentamethylene 1,5-diisocyanate (PDI), isophorone diisocyanate (IPDI), 4,4'-diisocyanatodicyclohexylmethane (H12MDI) and xylylene diisocyanate (XDI) were sourced from Covestro AG.

Butane-1,4-diol (BDO) was sourced from Ashland. Propane-1,3-diol (PDO), hexane-1,6-diol (HDO) and cyclohexane-1,4-dimethanol were sourced from Sigma-Aldrich. Each of the raw materials had a purity of ≥99% by weight.

Poly-THF® 100 obtained from BASF
Analytical grade acetone obtained from Merck
Analytical grade chlorobenzene obtained from Merck
Deionized water obtained from Wittig-Umweltchemie.
Farsoon FS 3300PA (PA12 powder) obtained from Farsoon.

Desmopan 3660 DU: Thermoplastic polyurethane obtained from Covestro.

Example 1: Preparation of a Polymer Usable According to the Invention

A nitrogen-inertized 5 l pressure tank fitted with an anchor stirrer, a bottom outlet and an internal thermometer was initially charged under nitrogen (1 bar) with butane-1,4-diol (1.35 kg) and this was stirred until an internal temperature of 90° C. was attained. The total amount of hexamethylene 1,6-diisocyanate was then continuously metered into the pressure tank (2.5 kg) over a period of 2 h while at the same time the reactor temperature was continuously increased to 190° C., wherein the addition was carried out so as to ensure that a reactor temperature of 200° C. was not exceeded. Once the addition of hexamethylene 1,6-diisocyanate was complete the mixture was stirred at 190° C. for a further 5 minutes and the polymer melt discharged under pressure via the bottom outlet using $N_2$ preheated to about 150° C.

The melting point (TM) of the polymer was 174.9° C. (DSC, 2nd heating after cooling at 20 K/min).

Example 2: Preparation of a Polymer Usable According to the Invention

A nitrogen-inertized 5 l pressure tank fitted with an anchor stirrer, a bottom outlet and an internal thermometer was initially charged under nitrogen (1 bar) with butane-1,4-diol (0.3 kg) in 3 kg of chlorobenzene and the mixture was stirred until an internal temperature of 120° C. was attained. The total amount of hexamethylene 1,6-diisocyanate was then continuously metered into the pressure tank (0.556 kg) over a period of 2 h while at the same time the reactor temperature was continuously increased to 140° C., wherein the addition was carried out so as to ensure that a reactor temperature of 160° C. was not exceeded. Once the addition of hexamethylene 1,6-diisocyanate was complete the mixture was stirred at 140° C. for a further 2 h, the polymer precipitated as a white, fine solid powder and after cooling to 23° C. said powder was filtered, washed with acetone and water and dried at 100° C. for 12 hours in a vacuum drying cabinet under a water jet pump vacuum.

The melting point (TM) of the polymer prepared was 180.2° C. (DSC, 2nd heating at 20 K/min).

Example 3 (FIG. 1): Preparation of a Polymer Usable According to the Invention

FIG. 1 shows a schematic diagram of the setup for performing the two-stage continuous preparation of a thermoplastic polyurethane having a high hard segment content.

311.7 g/h of hexamethylene 1,6-diisocyanate were conveyed from receiver 1 into mixer 100 with pump 100 (type: SyrDos2 fitted with 10 ml syringes from HiTec Zang). At the same time 208.7 g/h of butane-1,4-diol were conveyed from receiver 2 also into mixer 100 using pump 200 (type: SyrDos2 fitted with 10 ml syringes from HiTec Zang). Both material streams were mixed in the mixer 100 at room temperature. The mixer used was a cascade mixer from Ehrfeld Microtechnik BTS GmbH. The mixture was subsequently passed into the reactor 100 temperature-controlled to 190° C. (model: CSE-X/8G, shape G, internal diameter=12.3 mm, length=500 mm from Fluitec, heat exchange capacity of 60 kilowatts per cubic meter per Kelvin). The residence time in the reactor was 5 min. The prepolymer continuously exiting from reactor 100 was transferred through a pipe conduit heated to 200° C. into the second housing of a 2-shaft extruder (Miniextruder Process 11/Thermo Fisher). The extruder was heated to 200° C. over its entire length and the speed of the shafts was 100 rpm. 70.1 g/h of hexamethylene 1,6-diisocyanate were then introduced into barrel 3 of the extruder using pump 300 (type: SyrDos2 fitted with 10 ml syringes from HiTec Zang). The resultant milky-white product was discharged through the extruder nozzles, withdrawn as a strand, cooled in a water bath and pelletized. The average residence time over all process stages was about 6 minutes.

The melting point (TM) of the polymer prepared was 182.9° C. (DSC, 2nd heating at 20 K/min) and the hardness was over 75 Shore D.

Example 4: Preparation of a Polymer Usable According to the Invention

In an experimental setup as described in example 3, 311.7 g/h of hexamethylene 1,6-diisocyanate were metered in with pump 100, 273.7 g/h of hexane-1,6-diol with pump 200, and 70.1 g/h of hexamethylene 1,6-diisocyanate with pump 300, and were reacted. The average residence time over all process stages was about 6 minutes.

The melting point (TM) of the polymer prepared was 168.6° C. (DSC, 2nd heating after cooling at 20 K/min).

Example 5: Preparation of a Polymer Usable According to the Invention

In an experimental setup as described in example 3, 311.7 g/h of hexamethylene 1,6-diisocyanate were metered in with pump 100, 240.2 g/h of pentane-1,5-diol with pump 200, and 73.9 g/h of hexamethylene 1,6-diisocyanate with pump 300, and were reacted. The average residence time over all process stages was about 6 minutes.

The melting point (TM) of the polymer prepared was 152.7° C. (DSC, 2nd heating at 20 K/min).

Example 6: Preparation of a Polymer Usable According to the Invention

In an experimental setup as described in example 3, 311.7 g/h of hexamethylene 1,6-diisocyanate were metered in with pump 100, 176.1 g/h of propane-1,3-diol with pump 200, and 73.9 g/h of hexamethylene 1,6-diisocyanate with pump 300, and were reacted. The average residence time over all process stages was about 7 minutes.

The melting point (TM) of the polymer prepared was 161.8° C. (DSC, 2nd heating at 20 K/min).

Example 7: Preparation of a Polymer Usable According to the Invention

In an experimental setup as described in example 3, 285.7 g/h of pentamethylene 1,5-diisocyanate were metered in with pump 100, 176.2 g/h of propane-1,3-diol with pump 200, and 64.3 g/h of pentamethylene 1,5-diisocyanate with pump 300, and were reacted. The average residence time over all process stages was about 7 minutes.

The melting point (TM) of the polymer prepared was 153.3° C. (DSC, 2nd heating at 20 K/min).

Example 8: Preparation of a Polymer Usable According to the Invention

In an experimental setup as described in example 3, 285.7 g/h of pentamethylene 1,5-diisocyanate were metered in with pump 100, 208.7 g/h of butane-1,4-diol with pump 200, and 67.8 g/h of pentamethylene 1,5-diisocyanate with pump 300, and were reacted. The average residence time over all process stages was about 7 minutes.

The melting point (TM) of the polymer prepared was 160.9° C. (DSC, 2nd heating after cooling at 20 K/min).

Figure 2:
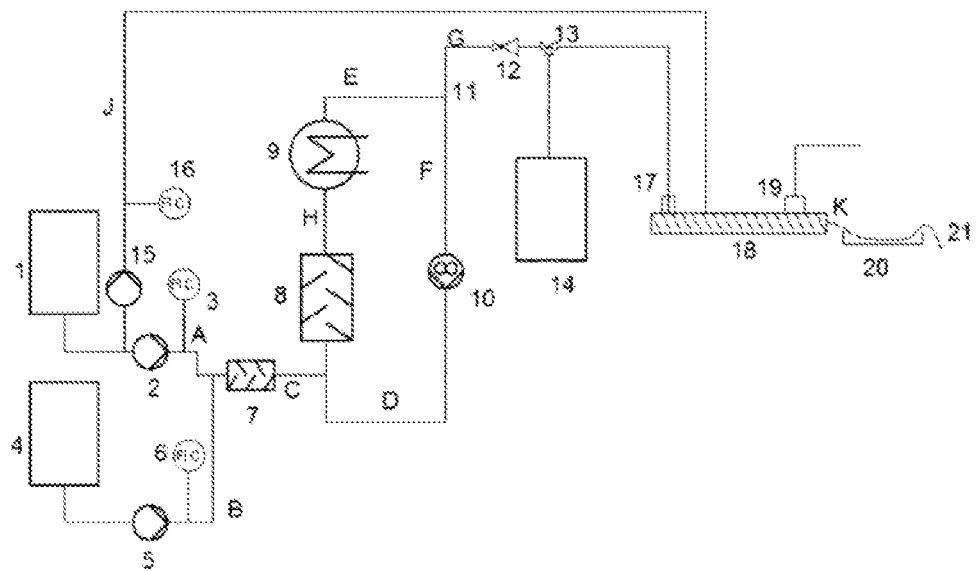
FIG. 2 shows a setup for performing the two-stage continuous preparation of a prepolymer through reaction in a loop reactor and an extruder.

Example 9 (FIG. 2): Preparation of a Polymer Usable According to the Invention An annular gear pump 2 (HNP, MZR 7255) was used to convey a hexamethylene 1,6-diisocyanate stream A from a 250 liter receiver for hexamethylene 1,6-diisocyanate 1 to a static mixer 7. The throughput of the hexamethylene 1,6-diisocyanate stream A was measured using a mass flow meter 3 (Bronkhorst, Mini Cori-Flow MIX, max. flow rate 12 kg/h) and adjusted to a value of 2.911 kg/h. An annular gear pump 5 (HNP, MZR 7205) was used to convey a butane-1,4-diol stream B from a 250 liter receiver for butane-1,4-diol 4 to the static mixer 7. The throughput of the butane-1,4-diol stream was measured using a mass flow meter 6 (Bronkhorst, Mini Cori-Flow MIX, max. flow rate 8 kg/h) and adjusted to a value of 2.000 kg/h. The temperature of the hexamethylene 1,6-diisocyanate was ambient temperature, about 25° C. The temperature of the butane-1,4-diol was 40° C. In the static mixer 7 (Sulzer SMX, diameter 6 mm, length to diameter ratio L/D=10) the hexamethylene 1,6-diisocyanate stream A and the butane-1,4-diol stream B were mixed with one another. This is stream C.

The mixed and dispersed stream C is in a circuit mixed with a circulating polymer stream D in a static mixer 8 (static mixer equivalent to Sulzer SMX, internal diameter 34 mm, L/D=20) to afford a stream H. The temperature of stream D was 182° C.

The mixed and already partly reacted stream H was passed into a temperature-controllable static mixer 9. The reaction was largely completed therein and the resulting heat of reaction removed. The temperature-controllable static mixer 9 was of similar construction to a Sulzer SMR reactor with internal crossed tubes. It had an internal volume of 1.9 liters, a heat exchange area of 0.31 square meters and a heat exchange capacity of 98 kW per cubic meter per Kelvin. It was heated/cooled with heat-transfer oil. The heating medium temperature at the inlet was 180° C.

The product stream exited the temperature-controllable static mixer 9 as a largely reacted stream E at a temperature of 183° C. At a branching 11, stream E was split into two substreams F and G. The pressure of substream F was increased in a gear pump 10. Substream F became the abovementioned substream D downstream of the pump.

The gear pump 10 (Witte Chem 25.6-3) had a volume per revolution of 25.6 cubic centimeters and a speed of 50 revolutions per minute.

The whole circuit was full. The mass flow rate of stream G was therefore identical to that of stream C. Stream G consisted of oligomer.

The whole circuit consisted of double-walled pipe conduits and apparatuses heated with thermal oil. The heating medium temperature was 182° C.

Downstream of the pressure-retaining valve 12, stream G was run past a three-way valve 13. On startup and shutdown or in the event of faults, it was possible to run said stream G to a waste vessel 14, an open 200 liter metal vat with extraction. In regular operation, stream G was guided to an extruder 18.

A micro annular gear pump 15 (MZR 6355 from HNP) was used to withdraw a hexamethylene 1,6-diisocyanate stream J from the hexamethylene 1,6-diisocyanate receiver 1. The throughput of the hexamethylene 1,6-diisocyanate stream J was measured using a mass flow meter 16 (Bronkhorst, Mini Cori-Flow MIX, maximum flow rate 2 kg/h) and adjusted to 0.784 kilograms per hour. The temperature of the hexamethylene 1,6-diisocyanate stream J was also room temperature, about 25° C. This stream was also passed to the extruder 18.

The extruder 18 was a ZSK 26 MC from Coperion, which was operated at temperatures of 200° C. and a speed of 66 revolutions per minute. In this extruder, stream G was freed of any inert gases entrained with material streams A and B and of possible volatile reaction products by means of a venting system 17 operated at a negative pressure of about 1 mbar relative to ambient pressure. Downstream of the addition of the oligomer stream G, the hexamethylene 1,6-diisocyanate stream J was added and the reaction to afford the polymer was performed. Before the end of the extruder, the resulting polymer stream was freed of volatile constituents via a degassing 19. The pressure in this degassing was 200 mbar below ambient pressure. The polymer stream K was expressed through two nozzles, cooled in a water bath filled with demineralized water, and chopped into pellets by means of a pelletizer 21. The average residence time over all process stages was 51 minutes.

The melting point (TM) of the polymer was 185.2° C. (DSC, 2nd heating at 20 K/min).

The molecular weight of the polymer according to GPC was Mn 10 880 g/mol, Mw 54 200 g/mol.

Mechanical properties:
Slow three-point bending test on 80×10×4 mm$^3$ rods at room temperature performed with an Instron 5566 universal tester at a speed of 5 mm/min and a support distance of 64 mm.
Slow tensile test at room temperature, performed with a Zwick Z010 universal testing machine at a speed of 10 mm/min.
Impact test based on Charpy at room temperature, carried out with an instrumented drop tester (proprietary construction of polymer physics) with a falling weight of 1.86 kg and a falling height of 50 cm, notch radius 0.25 mm.
Flexural modulus [MPa]: 1920±20; max. stress [MPa]: 81.4±0.2; elongation at max. stress [%]: 7.8±0.1
Tensile test: tensile modulus [MPa] 2210±58; stress at yield [MPa]: 9.62±0.4; elongation at yield [%]: 37.6±29.8; max. tensile stress [MPa]: 62.9±1.4
Notched impact (RT): Ak/50 cm/4 mm [kJ/m$^2$]: 2.4±0.4; type of break (n.b./p/c)*: c/c/c

*Type of break: without crack (n.b.)/cracked (p)/broken (c)

Example 10 (FIG. 2): Preparation of a Polymer Usable According to the Invention In an experimental setup as described in example 9 this time 2.711 kg/h of pentamethylene 1,5-diisocyanate (stream A) from receiver 1 and 2.000 kg/h of butane-1,4-diol (stream B) from receiver 4 were conveyed into static mixer 7. The throughput of the pentamethylene 1,5-diisocyanate stream J was adjusted to 0.677 kilogram per hour.

The temperatures of the raw materials and the temperatures of the other material streams and the plant parts and heating media corresponded to those as described in example 9. The extruder speed and the degassing pressures also corresponded to those in example 9. The average residence time over all process stages was 53 minutes.

The melting point (TM) of the polymer prepared was 159.0° C. (DSC, 2nd heating at 20 K/min).

Example 11: Preparation of a Polymer Usable According to the Invention

A nitrogen-inertized 101 pressure tank fitted with an anchor stirrer, a bottom outlet and an internal thermometer and a reflux condenser was initially charged under nitrogen (1 bar) with butane-1,4-diol (0.360 kg) with 0.1 g of DBTL in 4 kg of acetone and the mixture was stirred until an internal temperature of 50° C. was attained. The total amount of hexamethylene 1,6-diisocyanate was then continuously metered into the pressure tank (0.672 kg) over a period of 2 h, wherein the addition was carried out so as to ensure that a reactor temperature of 56° C. was not exceeded, this being ensured inter alia through the evaporative cooling of the acetone. Once the addition of hexamethylene 1,6-diisocyanate was complete the mixture was stirred at 50° C. for a further 5 hours until the isocyanate content according to titration of the acetone solution had fallen to 0% and the polymer precipitated quantitatively as a white, fine solid powder and after cooling to 23° C. was filtered, washed with water and dried at 100° C. for 12 h in a drying cabinet.

The melting point (TM) of the polymer was 174.2° C. (DSC, 2nd heating at 20 K/min).

Comparative Example 12: Preparation of a Polymer Not Usable According to the Invention A nitrogen-inertized 10 l pressure tank fitted with an anchor stirrer, a bottom outlet and an internal thermometer and a reflux condenser was initially charged under nitrogen (1 bar) with neopentyl glycol (0.416 kg) with 0.1 g of DBTL in 4 kg of acetone and the mixture was stirred until an internal temperature of 50° C. was attained. The total amount of hexamethylene 1,6-diisocyanate was then continuously metered into the pressure tank (0.672 kg) over a period of 2 h, wherein the addition was carried out so as to ensure that a reactor temperature of 56° C. was not exceeded, this being ensured inter alia through the evaporative cooling of the acetone. Once the addition of hexamethylene 1,6-diisocyanate was complete the mixture was stirred at 50° C. for a further 5 hours until the isocyanate content according to titration of the acetone solution had fallen to 0%. The polymer was soluble in acetone and was dried at 100° C. by distillative removal of the acetone. The polymer accumulates as a high-viscosity mass.

The glass transition point (TG) of the polymer was 5.5° C., a melting point was not determinable. (DSC, 2nd heating at 20 K/min). The molecular weight of the polymer according to GPC (THF, calibration against polystyrene standard) was Mw=23 000 g/mol.

Comparative Example 13: Preparation of a Polymer Not Usable According to the Invention A nitrogen-inertized 10 l pressure tank fitted with an anchor stirrer, a bottom outlet and an internal thermometer and a reflux condenser was initially charged under nitrogen (1 bar) with butanediol (0.360 kg) with 0.1 g of DBTL in 4 kg of acetone and the mixture was stirred until an internal temperature of 50° C. was attained. The total amount of H12-MDI was then continuously metered into the pressure tank (1.040 kg) over a period of 2 h, wherein the addition was carried out so as to ensure that a reactor temperature of 56° C. was not exceeded, this being ensured inter alia through the evaporative cooling of the acetone. Once the addition of hexamethylene 1,6-diisocyanate was complete the mixture was stirred at 50° C. for a further 5 hours until the isocyanate content according to titration of the acetone solution had fallen to 0%. The polymer precipitated quantitatively as a white, fine solid powder and after cooling to 23° C. was filtered, washed with water and dried at 100° C. for 12 h in a drying cabinet. The glass transition point (Tg) of the polymer was 95° C., a melting point was not determinable (DSC, 2nd heating at 20 K/min).

Comparative Example 14: Preparation of a Polymer Not Usable According to the Invention 64.4 kg/h of hexamethylene 1,6-diisocyanate, heated to 105° C., and a mixture of 22.8 kg/h of a poly-THF diol (1000 g/mol, BASF) with 32.9 kg/h of butane-1,4-diol, heated to 110° C., were metered into a barrel 1 of a twin-shaft extruder (ZSK 53 from Werner&Pfleiderer). The extruder speed was 270 rpm. The residence time in the extruder was about 42 seconds. At the extruder outlet, the melt was filtered through a single-ply metal sieve with a mesh size of 200 micrometers, withdrawn as a strand, cooled in a water bath and pelletized.

The melting point (TM) of the polymer prepared was 182.0° C. (DSC, 2nd heating at 20 K/min).

Comparative Example 15: Preparation of a Polymer Not Usable According to the Invention

HDI-BDO (NCO-INDEX: 0.7)

100 g (1.11 mol) of butane-1,4-diol are initially charged in a 500 ml flask under nitrogen at RT. 100 g of hexamethylene 1,6-diisocyanate (HDI) are then quickly added under nitrogen and the mass is slowly heated to 190° C. together with the oil bath with stirring.

The remaining 30.64 g (altogether 0.78 mol) of HDI are slowly added with constant stirring so that the temperature does not exceed 200° C. Once the addition is complete the mixture is stirred at 200° C. for a further 20 minutes and the product is poured into an aluminum dish and allowed to cool.

The melting point (TM) of the polymer prepared was 167.0° C. (DSC, 2nd heating at 5 K/min). Full width at half maximum: 17.1 K; the difference between the melting temperature and the recrystallization temperature determined at a heating and cooling rate of 20 K/min is 29.6° C.

Elemental analysis (% by wt.): Carbon (C): 55.1; Hydrogen (H): 8.9; Nitrogen (N): 9.3; Oxygen (O): 27.0. O:N ratio=2.90; N:C ratio=0.169.

Comparative Example 16: Preparation of a Polymer Not Usable According to the Invention

HDI-BDO (NCO-INDEX: 0.8)

100 g (1.11 mol) of butane-1,4-diol are initially charged in a 500 ml flask under nitrogen at RT. 100 g of hexamethylene 1,6-diisocyanate (HDI) are then quickly added under nitrogen and the mass is slowly heated to 190° C. together with the oil bath with stirring.

The remaining 49.2 g (altogether 0.89 mol) of HDI are slowly added with constant stirring so that the temperature does not exceed 200° C. Once the addition is complete the mixture is stirred at 200° C. for a further 20 minutes and the product is poured into an aluminum dish and The melting point (TM) of the polymer prepared was 178.6° C. (DSC, 2nd heating at 5 K/min). Full width at half maximum: 15.1 K; the difference between the melting temperature and the recrystallization temperature determined at a heating and cooling rate of 20 K/min is 41.9° C.

Elemental analysis (% by wt.): Carbon (C): 55.1; Hydrogen (H): 8.9; Nitrogen (N): 9.8; Oxygen (O): 26.5. O:N ratio=2.70; N:C ratio=0.178.

Comparative Example 17: Preparation of a Polymer Not Usable According to the Invention

HDI-BDO (NCO-INDEX: 1.2)

168 g (1.0 mol) of hexamethylene 1,6-diisocyanate (HDI) are initially charged in a 500 ml flask under nitrogen (purge!) at RT. 50 g of butane-1,4-diol (BDO) are then quickly added under nitrogen and the mass is slowly heated to 170° C. together with the oil bath with stirring.

The remaining 22 g (altogether 0.8 mol) of BDO are slowly added with constant stirring so that the temperature does not exceed 180° C. Once the addition is complete the mixture is stirred at 180° C. for a further 10 minutes and the product is poured into a plastic bottle (PP)/aluminum bottle (standing in a water bath) and allowed to cool.

The melting point (TM) of the polymer prepared was 154.0° C. (DSC, 2nd heating at 5 K/min). Full width at half maximum: 23.2 K; the difference between the melting temperature and the recrystallization temperature determined at a heating and cooling rate of 20 K/min is 94.8° C.

Elemental analysis (% by wt.): Carbon (C): 55.6; Hydrogen (H): 8.7; Nitrogen (N): 11.5; Oxygen (O): 24.4. O:N ratio=2.12; N:C ratio=0.21.

Comparative Example 18: Preparation of a Polymer Not Usable According to the Invention

HDI-BDO (NCO-INDEX: 0.81)

Figure 3:
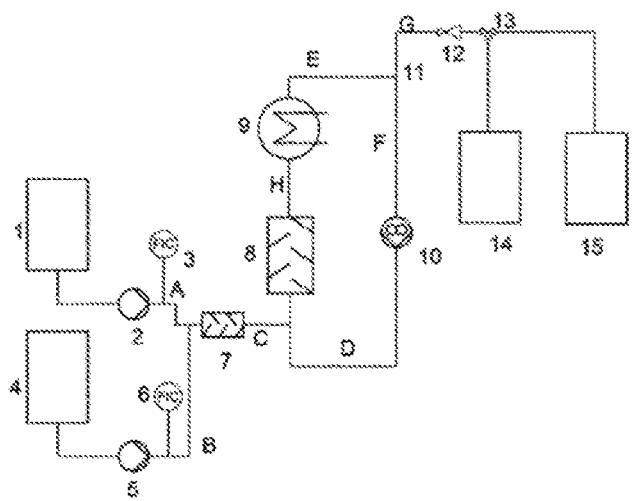
FIG. 3 shows a setup for performing a one-stage continuous preparation of a prepolymer through reaction in a loop reactor.

FIG. 3 shows a schematic diagram of the setup for performing the single-stage continuous preparation of a thermoplastic polyurethane having a high hard segment content.

An annular gear pump 2 (HNP, MZR 7255) was used to convey a hexamethylene 1,6-diisocyanate stream A from a 250 liter receiver for hexamethylene 1,6-diisocyanate 1 to a static mixer 7. The throughput of the hexamethylene 1,6-diisocyanate stream A was measured using a mass flow meter 3 (Bronkhorst, Mini Con-Flow M1X, max. flow rate 12 kg/h). An annular gear pump 5 (HNP, MZR 7205) was used to convey a butane-1,4-diol stream B from a 250 liter receiver for butane-1,4-diol 4 to the static mixer 7. The throughput of the butane-1,4-diol stream was measured using a mass flow meter 6 (Bronkhorst, Mini Cori-Flow M1X, max. flow rate 8 kg/h). The temperature of the hexamethylene 1,6-diisocyanate was room temperature. The temperature of the butane-1,4-diol was 40° C. In the static mixer 7 (Sulzer SMX, diameter 6 mm, length to diameter ratio L/D=10) the hexamethylene 1,6-diisocyanate stream A and the butane-1,4-diol stream B were mixed with one another. This is stream C.

The mixed and dispersed stream C is in a circuit mixed with a circulating polymer stream D in a static mixer 8 (static mixer equivalent to Sulzer SMX, internal diameter 34 mm, L/D=20) to afford a stream H. The temperature of stream D was 182° C.

The mixed and already partly reacted stream H was passed into a temperature-controllable static mixer 9. The reaction was largely completed therein and the resulting heat of reaction removed. The temperature-controllable static mixer 9 was of similar construction to a Sulzer SMR reactor with internal crossed tubes. It had an internal volume of 1.9 liters, and a heat exchange area of 0.44 square meter. It was heated/cooled with heat-transfer oil. The heating medium temperature at the inlet was 180° C.

The product stream exited the temperature-controllable static mixer 9 as a largely reacted stream E at a temperature of 183° C. At a branching 11, stream E was split into two substreams F and G. The pressure of substream F was increased in a gear pump 10. Substream F became the abovementioned substream D downstream of the pump.

The gear pump 10 (Witte Chem 25.6-3) had a volume per revolution of 25.6 cubic centimeters and a speed of 50 revolutions per minute.

The whole circuit was full and the polymer was largely incompressible. The mass flow rate of stream G was therefore identical to that of stream C. Stream G consisted of the desired prepolymer.

The whole circuit consisted of double-walled pipe conduits and apparatuses heated with thermal oil. The heating medium temperature was 182° C.

Beyond the pressure-retaining valve 12, stream G was run past a three-way valve 13. On startup and shutdown or in the event of faults, it was possible to run said stream G to a waste vessel 14, an open 60 liter metal vat with extraction, or to the product collection vessel 15, an open 120 liter metal vat with extraction.

The sample used was taken 4 hours after the process had fully settled.

Average molecular weight (GPC): Mw=19 100 g/mol.

The melting point (TM) of the polymer prepared was 175.9° C. (DSC, 2nd heating at 5 K/min). Full width at half maximum: 11.7 K; the difference between the melting temperature and the recrystallization temperature determined at a heating and cooling rate of 20 K/min is 40.7° C.

Elemental analysis (% by wt.): Carbon (C): 55.3; Hydrogen (H): 9.4; Nitrogen (N): 9.8; Oxygen (O): 25.8. O:N ratio=2.633; N:C ratio=0.177.

Comparative Example 19: Preparation of a Polymer Not Usable According to the Invention

HDI-BDO (NCO-INDEX: 0.7)

FIG. 3 shows a schematic diagram of the setup for performing the single-stage continuous preparation of a thermoplastic polyurethane having a high hard segment content.

An annular gear pump 2 (HNP, MZR 7255) was used to convey a hexamethylene 1,6-diisocyanate stream A from a 250 liter receiver for hexamethylene 1,6-diisocyanate 1 to a static mixer 7. The throughput of the hexamethylene 1,6-diisocyanate stream A was measured using a mass flow meter 3 (Bronkhorst, Mini Con-Flow M1X, max. flow rate 12 kg/h). An annular gear pump 5 (HNP, MZR 7205) was used to convey a butane-1,4-diol stream B from a 250 liter receiver for butane-1,4-diol 4 to the static mixer 7. The throughput of the butane-1,4-diol stream was measured using a mass flow meter 6 (Bronkhorst, Mini Cori-Flow M1X, max. flow rate 8 kg/h). The temperature of the hexamethylene 1,6-diisocyanate was room temperature. The temperature of the butane-1,4-diol was 40° C. In the static mixer 7 (Sulzer SMX, diameter 6 mm, length to diameter ratio L/D=10) the hexamethylene 1,6-diisocyanate stream A and the butane-1,4-diol stream B were mixed with one another. This is stream C.

The mixed and dispersed stream C is in a circuit mixed with a circulating polymer stream D in a static mixer 8 (static mixer equivalent to Sulzer SMX, internal diameter 34 mm, L/D=20) to afford a stream H. The temperature of stream D was 182° C.

The mixed and already partly reacted stream H was passed into a temperature-controllable static mixer 9. The reaction was largely completed therein and the resulting heat of reaction removed. The temperature-controllable static mixer 9 was of similar construction to a Sulzer SMR reactor with internal crossed tubes. It had an internal volume of 1.9 liters, and a heat exchange area of 0.44 square meter. It was heated/cooled with heat-transfer oil. The heating medium temperature at the inlet was 180° C.

The product stream exited the temperature-controllable static mixer 9 as a largely reacted stream E at a temperature of 183° C. At a branching 11, stream E was split into two substreams F and G. The pressure of substream F was increased in a gear pump 10. Substream F became the abovementioned substream D downstream of the pump.

The gear pump 10 (Witte Chem 25.6-3) had a volume per revolution of 25.6 cubic centimeters and a speed of 50 revolutions per minute.

The whole circuit was full and the polymer was largely incompressible. The mass flow rate of stream G was therefore identical to that of stream C. Stream G consisted of the desired prepolymer.

The whole circuit consisted of double-walled pipe conduits and apparatuses heated with thermal oil. The heating medium temperature was 182° C.

Beyond the pressure-retaining valve 12, stream G was run past a three-way valve 13. On startup and shutdown or in the event of faults, it was possible to run said stream G to a waste vessel 14, an open 60 liter metal vat with extraction, or to the product collection vessel 15, an open 120 liter metal vat with extraction.

The sample used was taken 4 hours after the process had fully settled.

Average molecular weight (GPC): Mw=6200 g/mol.

The melting point (TM) of the polymer prepared was 170.3° C. (DSC, 2nd heating at 5 K/min). Full width at half maximum: 14.4 K; the difference between the melting temperature and the recrystallization temperature determined at a heating and cooling rate of 20 K/min is 38.9° C.

Elemental analysis (% by wt.): Carbon (C): 54.9; Hydrogen (H): 9.6; Nitrogen (N): 9.2; Oxygen (O): 26.5. O:N ratio=2.880; N:C ratio=0.168.

Example 20: Preparation of a Polymer Usable According to the Invention as a Repetition of Example 3

HDI-BDO (NCO-INDEX: 0.98)

FIG. 1 shows a schematic diagram of the setup for performing the two-stage continuous preparation of a thermoplastic polyurethane having a high hard segment content.

311.7 g/h of hexamethylene 1,6-diisocyanate were conveyed from receiver 1 into mixer 100 with pump 100 (type: SyrDos2 fitted with 10 ml syringes from HiTec Zang). At the same time 208.7 g/h of butane-1,4-diol were conveyed from receiver 2 also into mixer 100 using pump 200 (type: SyrDos2 fitted with 10 ml syringes from HiTec Zang). Both material streams were mixed in the mixer 100 at room temperature. The mixer used was a cascade mixer from Ehrfeld Microtechnik BTS GmbH. The mixture was subsequently passed into the reactor 100 temperature-controlled to 190° C. (model: CSE-X/8G, shape G, internal diameter=12.3 mm, length=500 mm from Fluitec, heat exchange capacity of 60 kilowatts per cubic meter per Kelvin). The residence time in the reactor was 5 min. The prepolymer continuously exiting from reactor 100 was transferred through a pipe conduit heated to 200° C. into the second housing of a 2-shaft extruder (Miniextruder Process 11/Thermo Fisher). The extruder was heated to 200° C. over its entire length and the speed of the shafts was 100 rpm. 70.1 g/h of hexamethylene 1,6-diisocyanate were then introduced into barrel 3 of the extruder using pump 300 (type: SyrDos2 fitted with 10 ml syringes from HiTec Zang). The resultant milky-white product was discharged through the extruder nozzles, withdrawn as a strand, cooled in a water bath and pelletized. The average residence time over all process stages was about 6 minutes.

Average molecular weight (GPC): Mw=132 000 g/mol.

The melting point (TM) of the polymer prepared was 181.1° C. (DSC, 2nd heating at 5 K/min). Full width at half maximum: 8.24 K; the difference between the melting temperature and the recrystallization temperature determined at a heating and cooling rate of 20 K/min is 32.1° C.

Elemental analysis (% by wt.): Carbon (C): 55.9; Hydrogen (H): 9.0; Nitrogen (N): 10.3; Oxygen (O): 25.1. O:N ratio=2.437; N:C ratio=0.184.

The hardness was over 75 Shore D.

Example 21: Preparation of a Polymer Usable According to the Invention

HDI-BDO (NCO-INDEX: 0.95)

FIG. 1 shows a schematic diagram of the setup for performing the two-stage continuous preparation of a thermoplastic polyurethane having a high hard segment content.

311.7 g/h of hexamethylene 1,6-diisocyanate were conveyed from receiver 1 into mixer 100 with pump 100 (type: SyrDos2 fitted with 10 ml syringes from HiTec Zang). At the same time 208.7 g/h of butane-1,4-diol were conveyed from receiver 2 also into mixer 100 using pump 200 (type: SyrDos2 fitted with 10 ml syringes from HiTec Zang). Both material streams were mixed in the mixer 100 at room temperature. The mixer used was a cascade mixer from Ehrfeld Microtechnik BTS GmbH. The mixture was subsequently passed into the reactor 100 temperature-controlled to 190° C. (model: CSE-X/8G, shape G, internal diameter=12.3 mm, length=500 mm from Fluitec, heat exchange capacity of 60 kilowatts per cubic meter per Kelvin). The residence time in the reactor was 5 min. The prepolymer continuously exiting from reactor 100 was transferred through a pipe conduit heated to 200° C. into the second housing of a 2-shaft extruder (Miniextruder Process 11/Thermo Fisher). The extruder was heated to 200° C. over its entire length and the speed of the shafts was 100 rpm. 58.7 g/h of hexamethylene 1,6-diisocyanate were then introduced into barrel 3 of the extruder using pump 300 (type: SyrDos2 fitted with 10 ml syringes from HiTec Zang). The resultant milky-white product was discharged through the extruder nozzles, withdrawn as a strand, cooled in a water bath and pelletized. The average residence time over all process stages was about 6 minutes.

Average molecular weight (GPC): Mw=34 000 g/mol.

The melting point (TM) of the polymer prepared was 181.4° C. (DSC, 2nd heating at 5 K/min). Full width at half maximum: 8.26 K; the difference between the melting temperature and the recrystallization temperature determined at a heating and cooling rate of 20 K/min is 31.1° C.

Elemental analysis (% by wt.): Carbon (C): 55.7; Hydrogen (H): 9.2; Nitrogen (N): 10.5; Oxygen (O): 25.6. O:N ratio=2.438; N:C ratio=0.189.

The hardness was over 75 Shore D.

Comparative Example 22: TPU Desmopan 3660 DU

This thermoplastic polyurethane was mentioned as TPU 3 in the examples of international patent application WO 2018/197396.

The melting point (TM) of TPU 3660 is 173.9° C. and the melting point width is 24.32° C. The difference between the melting temperature and the recrystallization temperature determined at a first heating and cooling rate of 20 K/min is 25.8° C.

Elemental analysis (% by wt.): Carbon (C): 64.4; Hydrogen (H): 7.3; Nitrogen (N): 4.9; Oxygen (O): 24.2. O:N ratio=4.939; N:C ratio=0.076.

The hardness was 60 Shore D.

TABLE 1

Viscosity ratios at different temperatures
Prior to measurement the samples were dried in a vacuum oven at 40° C. for 4 days, pressed into test specimens at 190° C. and measured with an ARES rheometer, system PP35mm, under an $N_2$ atmosphere. The material Farsoon FS 2200 PA tested as a comparative example was a PA 12 material. The specification $\eta^*$ denotes the complex viscosity.

| Example | T [° C.] | $\eta^*$ [° C.] | Residual viscosity [%] $\eta^*(200° C.)/\eta^*(190° C.)$ or $\eta^*(240° C.)/\eta^*(190° C.)$ |
|---|---|---|---|
| 9* | 189.2 | 258 | |
| | 201.3 | 168 | 65 |
| | 240.4 | 10 | 4 |
| Farsoon FS 3300 PA | 189.3 | 212 | |
| | 201.2 | 157 | 74 |
| | 240.2 | 78 | 37 |
| 15 | 189.6 | 0.048 | |
| | 199.8 | 0.034 | 83 |
| | 240 | 0.013 | 27 |
| 16 | 189.6 | 0.12 | |
| | 199.7 | 0.11 | 92 |
| | 240 | 0.04 | 33 |
| 17 | 190 | 127 | |
| | 200 | 479 | 377 |
| | 240 | 2548 | 2006 |
| 18 | 189.6 | 1.78 | |
| | 199.8 | 1.18 | 66 |
| | 240 | 0.18 | 10 |
| 19 | 189.6 | 0.26 | |
| | 199.7 | 0.18 | 69 |
| | 240 | 0.07 | 27 |
| 20* | 189.6 | 217 | |
| | 199.7 | 131 | 60 |
| | 240 | 4 | 2 |
| 21* | 189.6 | 116 | |
| | 199.7 | 73 | 63 |
| | 240 | 3 | 3 |
| 22 | 189.6 | 234792 | |
| | 199.8 | 65598 | 28 |
| | 240 | 52 | <1 |

0.2% by weight, based on TPU, of hydrophobized fumed silica flow promoter (Aerosil® R972 from Evonik) was added to the materials prepared in examples 20 and 21 and comparative examples 18 and 19 and the mixture was mechanically processed into powder under cryogenic conditions (cryogenic comminution) in a pinned-disk mill and then classified using a sieving machine. 90% by weight of the composition from 20 and 21 had a particle diameter of less than 140 µm (measured by laser diffraction (HELOS particle size analysis)). This high powder yield distinguishes the inventive products from conventional TPU where markedly lower product yields are often achieved or the products require repeated comminution to obtain the desired properties in sufficient amounts. The noninventive comparative examples 18 and 19 also have a high powder yield but on account of their higher brittleness a markedly higher fines fraction which in the course of laser sintering results in marked powder plumes.

The materials obtained were used to produce S2 test bars by the powder sintering process.

The powder materials obtained were sieved before each sintering experiment and introduced into the reservoir of the employed 3D powder printer under a protective gas atmosphere (nitrogen). During the entire printing operation, the receiver, build space and overflow were under a protective gas atmosphere. The build space was heated to the build space temperature (see table 2) and temperature-controlled about 30 minutes before commencement of the build task. The sintering parameters can likewise be found in the table below. After termination of 3D printing the build space was allowed to cool slowly under a protective gas atmosphere and the powder cake was removed from the build space. The sintered parts were freed of excess powder first roughly by mechanical means and then with compressed air, before they were subjected to mechanical examination.

TABLE 2

Printing parameters and printing results in powder printing of hard TPU
Inventive examples are marked with *

| Sample | Modulus tensile test (MPa) | Tensile strength tensile test (N/mm) | Poured density (g/cm3) | Printed component density (g/cm3) | Build space temperature (° C.) | Laser power (W) 2 laser scans |
|---|---|---|---|---|---|---|
| 20* | 1470 | 33 | 0.47 | 1.103 | 158 | 28/28 |
| 21* | 1570 | 15 | 0.48 | 1.061 | 158 | 36/28 |
| 19 | too brittle | too brittle | 0.49 | 1.025 | 145 | 20/20 |
| 18 | too brittle | too brittle | 0.49 | 1.031 | 145 | 20/20 |

The invention claimed is:

1. A process for producing an article comprising the step of producing the article by means of an additive manufacturing process from a build material,
wherein the build material comprises a first polyurethane polymer which has a percent by weight ratio of O to N determined by elemental analysis of ≥2 to ≤2.5, a weight ratio of N to C determined by elemental analysis of ≥0.1 to ≤0.25, a full width at half maximum of the melting peak determined by differential scanning calorimetry (DSC; 2nd heating at heating rate of 5 K/min) of ≤20 K and a difference between the melting temperature and the recrystallization temperature determined by differential scanning calorimetry (DSC; 2nd heating) at a heating and cooling rate of 20 K/min of ≥5 K and ≤100 K.

2. The process as claimed in claim 1, wherein the first polyurethane polymer comprises a proportion of hard segments of ≥80% by weight to ≤100% by weight, expressed as the weight ratio of the sum of constituents derived from Zerewitinoff-active compounds having three or fewer repeating units in the molecule and the isocyanate units joined thereto to the total weight of the polyurethane polymer.

3. The process as claimed in claim 1, wherein the first polyurethane polymer is obtained from the reaction of an isocyanate component comprising ≥80% by weight of aliphatic isocyanates and an isocyanate-reactive component.

4. The process as claimed in claim 1, wherein the first polyurethane polymer is obtained from the reaction of an isocyanate component comprising >80% by weight of linear aliphatic isocyanates and an isocyanate-reactive component comprising ≥80% by weight of linear aliphatic polyols.

5. The process as claimed in claim 1, wherein the first polyurethane polymer is obtained from the reaction of a linear diisocyanate component comprising ≥80% by weight of a linear aliphatic isocyanate component and a linear diol component comprising ≥80% by weight of a linear aliphatic polyol component.

6. The process as claimed in claim 1, wherein the build material has a melting point determined by differential scanning calorimetry (DSC; $2^{nd}$ heating at a heating rate of 20 K/min) of ≥120° C. to ≤189° C. and the full width at half maximum of the melting point peak (differential scanning calorimetry, DSC; 2nd heating at a heating rate of 5 K/min) of the build material is ≥5 K to ≤20 K.

7. The process as claimed in claim 1, wherein the build material exhibits after 1000 hours of SAE J 1960 CAM 180 weathering a color number increase of ≤50 in the b value.

8. The process as claimed in claim 1, wherein a complex viscosity of the molten build material determined via a plate/plate rheometer at 1/s and 0.1% amplitude at 200° C., measured after 1 minute in each case, is still ≥50% of the complex viscosity of the molten build material measured at 190° C. and the complex viscosity of the molten build material measured at 240° C. is only ≤15% of the complex viscosity of the molten build material measured at 190° C.

9. The process as claimed in claim 8, wherein the complex viscosity of the molten build material at 240° C. regains ≥50% of a starting viscosity according to ISO 6721-10: 2015-09 at 1/s and 0.1% deformation at 190° C. after 1 minute after cooling to 190° C.

10. The process as claimed in claim 1, wherein the production of the article by means of the additive manufacturing process comprises the steps of:
applying a layer of particles comprising the build material to a target surface;
optionally printing a radiant energy-absorbing and/or radiant energy-reflecting material onto a selected portion of the layer and energizing the layer, wherein the selected portion of the layer exhibits a higher or lower absorption of the energy, so that the particles in the selected portion or surrounding the selected portion are joined according to a cross section of the article;
energizing a selected portion of the layer corresponding to a cross section of the article to join the particles in the selected portion;
repeating the steps of applying and energizing for a plurality of layers to join the joined portions of the adjacent layers to form the article.

11. The process as claimed in claim 1, wherein the production of the article by means of the additive manufacturing process comprises the steps of:
- applying a filament of an at least partially molten build material to a carrier to obtain a layer of the build material corresponding to a first selected cross section of the article;
- optionally applying a filament of the at least partially molten build material to a previously applied layer of the build material to obtain a further layer of the build material which corresponds to a further selected cross section of the article and is joined to the previously applied layer;
- optionally repeating the step of applying a filament of the at least partially molten build material to a previously applied layer of the build material until the article has been formed.

12. The process as claimed in claim 1, wherein the process is performed inside a build space and the temperature of the build space is $\geq 5°$ C. lower than the melting temperature $T_m$ of the build material (determined by differential scanning calorimetry DSC; according to DIN EN ISO 11357-1:2017-02 at a heating rate of 20° C./min).

13. An article obtained by a process according to claim 1, wherein the article is produced from a build material comprising a first polyurethane polymer which has a percent by weight ratio of O to N determined by elemental analysis of $\geq 2$ to $\leq 2.5$, a weight ratio of N to C determined by elemental analysis of $\rightarrow 0.1$ to $\leq 0.25$, a full width at half maximum of the melting peak determined by differential scanning calorimetry (DSC; 2nd heating at heating rate of 20 K/min) of $\leq 20$ K and a difference between the melting temperature and the recrystallization temperature determined by differential scanning calorimetry (DSC; 2nd heating) at a heating and cooling rate of 20 K/min of $\geq 5$ K and $\leq 100$ K and wherein the article has a tensile strength (ISO 527:2012) in the build direction of the additive manufacturing process used in its production which is $\geq 20\%$ to $\leq 100\%$ of the tensile strength (ISO 527:2012) of an injection molded test specimen made of the same build material.

14. The article as claimed in claim 13, wherein the first polyurethane polymer comprises a proportion of hard segments of $\geq 80\%$ by weight to $\leq 100\%$ by weight, expressed as the weight ratio of the sum of constituents derived from Zerewitinoff-active compounds having three or fewer repeating units in the molecule and the isocyanate units joined thereto to the total weight of the polyurethane polymer.

15. The article as claimed in claim 13, wherein the first polyurethane polymer is obtained from the reaction of an isocyanate component comprising $\geq 80\%$ by weight of linear aliphatic isocyanates and an isocyanate-reactive component comprising $\geq 80\%$ by weight of linear aliphatic polyols.

* * * * *